US005561637A

United States Patent [19]

Dan et al.

[11] Patent Number: 5,561,637
[45] Date of Patent: Oct. 1, 1996

[54] PACE CONTROL FOR MULTICASTING IN A VIDEO SERVER ENVIRONMENT

[75] Inventors: Asit Dan, West Harrison; Brent T. Hailpern, Katonah; Dinkar Sitaram, Yorktown Heights, all of N.Y.

[73] Assignee: International Business Machines Corporation, Armonk, N.Y.

[21] Appl. No.: 527,301

[22] Filed: Sep. 12, 1995

[51] Int. Cl.$^6$ .......................... G11C 8/00; G11C 15/00; H04N 7/10; G01R 31/28

[52] U.S. Cl. .......................... 365/230.03; 365/49; 348/7

[58] Field of Search ................................ 365/230.03, 49; 348/7; 371/19

[56] References Cited

U.S. PATENT DOCUMENTS 5,453,779  9/1995  Dan et al. ..................................... 348/7

OTHER PUBLICATIONS

K. Hwang et al. "A Preliminary Study of Push vs. Pull in Motion Video Servers", Second Workshop on High Performance Commnication Subsystems, HPCS'93, Williamsburg, VA, Sep. 1993.

Primary Examiner—David C. Nelms
Assistant Examiner—Trong Phan
Attorney, Agent, or Firm—Richard M. Ludwin

[57] ABSTRACT

A system and method for controlling transmission of a data stream by a server to a plurality of clients in a multicast group. In a first embodiment, one of the clients in a multicast group is designated as a leader. When a service request for transmission of a portion of the data stream is received by the server from any of the clients, the server determines if the service request was from the leader. Responsive to determining that the service request was from the leader, the server broadcasts the portion of the data stream to the clients in the multicast group. Otherwise the broadcasting is deferred. In another embodiment responsive to receipt of the service request for playout of a portion of a video (e.g. a block) from any of the clients in a multicast group, the server determines if a predetermined broadcast criteria has been satisfied. If so the server broadcasts the requested portion to all of the clients in the multicast group. Otherwise, the portion is not multicast to the group and the system is again checked against the broadcast criteria when another service request is received from any of the clients.

5 Claims, 5 Drawing Sheets

PACE CONTROL FOR MULTICASTING IN A VIDEO SERVER ENVIRONMENT

BACKGROUND OF THE INVENTION

1. Field of the Invention

The present invention relates to a movie on demand system and video conferencing system of the type wherein multiple clients are serviced by video streams delivered from a central video server.

2. Related Art

In many movie on demand systems and video conferencing systems, multiple clients are serviced by video streams delivered from a central video server. This process (serving multiple clients from a single stream) is referred to as multicasting. In such systems, video is typically delivered by the server to clients in either of two ways: "client pull" or "server push". In a client pull mechanism, the server delivers blocks at the request of the clients. In contrast, in a server push mechanism, the server delivers blocks periodically to the clients. A discussion of client pull and server push strategies can be found in the paper "A Preliminary Study of Push vs. Pull in Motion Video Servers", Second Workshop on High Performance Communication Subsystems, HPCS'93, Williamsburg, Va., September 1993, by K. Hwang et al.

The client pull mechanism incurs additional messages since a client has to notify the server its readiness to receive a new block.

The server push mechanism on the other hand may send a new data block to clients even when earlier blocks are not processed (played back). This is because the play back rate is not the same for all compressed data blocks. Therefore, a larger amount of buffer is required in each client to avoid buffer overflow problem.

The issues are similar in an applications such as teleconferencing, where the same data stream is multicast to multiple clients.

SUMMARY OF THE INVENTION

A method for controlling pace of multicast of data blocks to all clients simultaneously viewing the same video. A combination of client pull and server push mechanisms is used to avoid both the larger buffer requirement at the clients, as well as the higher message overhead incurred by the sole client pull mechanism.

In a first embodiment, one of the clients in a multicast group is designated as a leader. When a service request for transmission of a portion of the data stream is received by the server from any of the clients, the server determines if the service request was from the leader. Responsive to determining that the service request was from the leader, the server broadcasts the portion of the data stream to the clients in the multicast group. Otherwise the broadcasting is deferred.

In another embodiment responsive to receipt of the service request for playout of a portion of a video (e.g. a block) from any of the clients in a multicast group, the server determines if a predetermined broadcast criteria has been satisfied. If so the server broadcasts the requested portion to all of the clients in the multicast group. Otherwise, the portion is not multicast to the group and the system is again checked against the broadcast criteria when another service request is received from any of the clients.

DETAILED DESCRIPTION OF A PREFERRED EMBODIMENT

Figure 1:
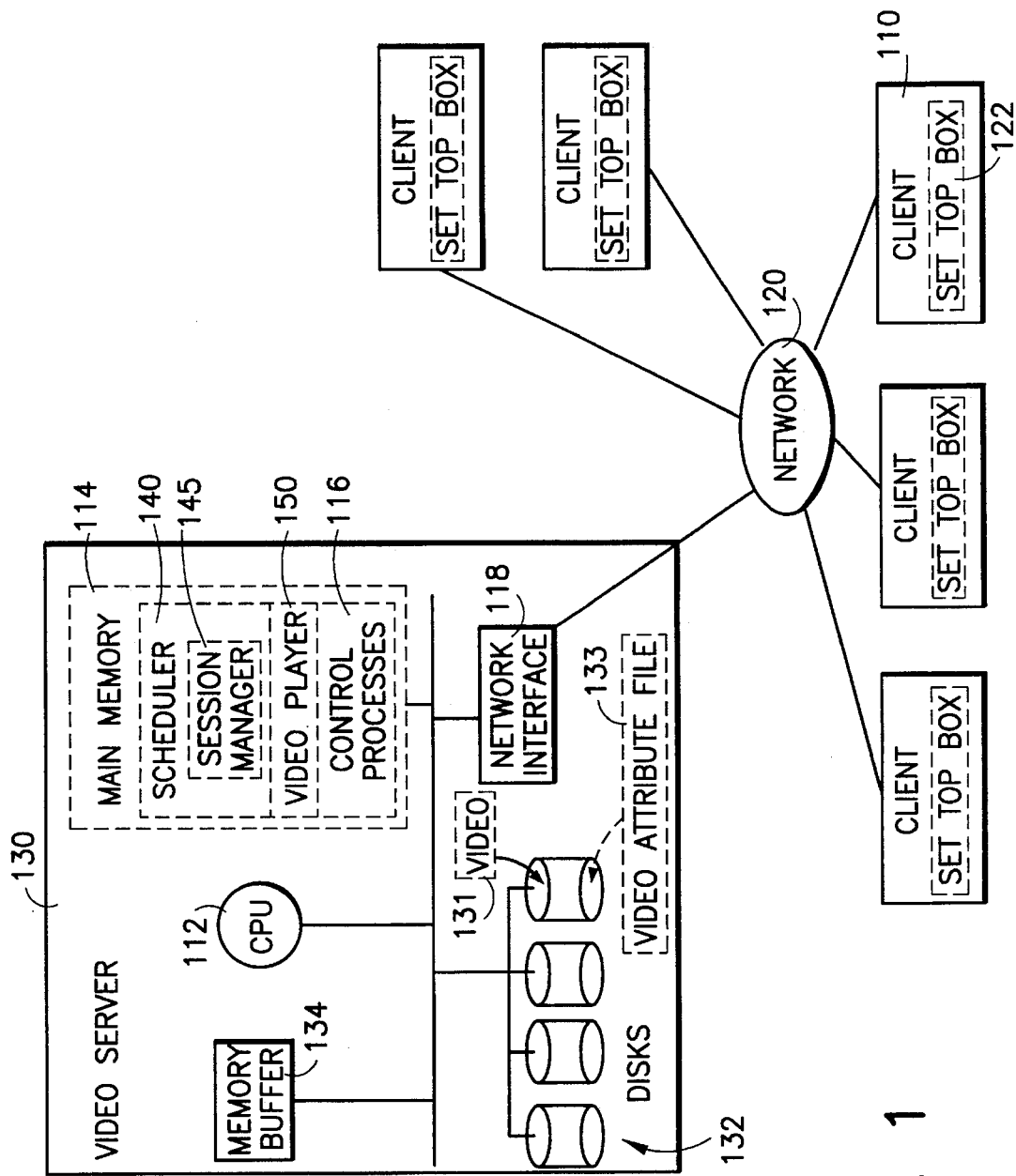
FIG. 1 is a block diagram of a video-on-demand system according to an embodiment of the present invention.

FIG. 1 is a block diagram of a video-on-demand system according to an embodiment of the present invention. The video-on-demand system includes a video server 130, wherein videos (e.g. 131), such as movies and the like, are stored in storage devices such as a disk array 132. Also, stored on the disk array are video attribute files 133, one for each video, which store information such as size and playrate of the video. In accordance with an embodiment of the present invention, the video attribute files also contain play history information, which will be described in more detail later.

The video server 130 is coupled to a communication network 120 by way of conventional network interface 118. Clients 110 make requests to the video server 130 via the communication network 120. Clients can submit start, stop, pause and resume requests by way of client stations 122. In order to facilitate batching, VCR control and other functions, the requested videos (or segments of the requested videos) are loaded into a memory buffer 134 from the disks 132 and then served to the clients via the buffer 134.

The video server 130 includes a processor (cpu) 112 which performs under control of the various programs residing in a main memory 114. These programs include a scheduler 140 that reserves a channel (i.e., resources) and sets up viewing sessions (by way of a session manager 145) before the start of video playback, and a video player 150 that can start, stop, pause and resume of video playback upon client request after the scheduler makes a channel available. Those of skill in the art will recognize that a number of conventional software processes 116, not described in detail here, are also involved in the control and support of the video server functions.

The video server 130 can be embodied using any processor of sufficient performance for the number of video streams to be supported. For example, a small capacity video server could be embodied using a RISC System/6000 TM system while a larger capacity server could be embodied using an ES/9000 TM system (both available form International Business Machines Corporation of Armonk, N.Y.). This disks 132 can be embodied as any conventional disk subsystem or disk array. The communication network 120 can be, for example, a fiber optic network or a conventional bidirectional cable network. The client stations 122 can be embodied, for example, as a set-top box.

One way to integrate both the client pull and server push strategies is to designate a particular client for a given multicast group (i.e. a group of clients viewing the same video as part of the same session) as the leader. The identity of the clients in each multicast group is maintained in a data structure (stored in the memory or the disk) which is shared by the session manager and the video player. When the leader requires the next block of the video, it sends a pull request to the server. The server treats this as a request on behalf of all clients in the multicast group. Thus, in response to the pull request the server pushes (multicasts) the requested block of the vide to all clients, thus creating a hybrid push/pull system.

Figure 2:
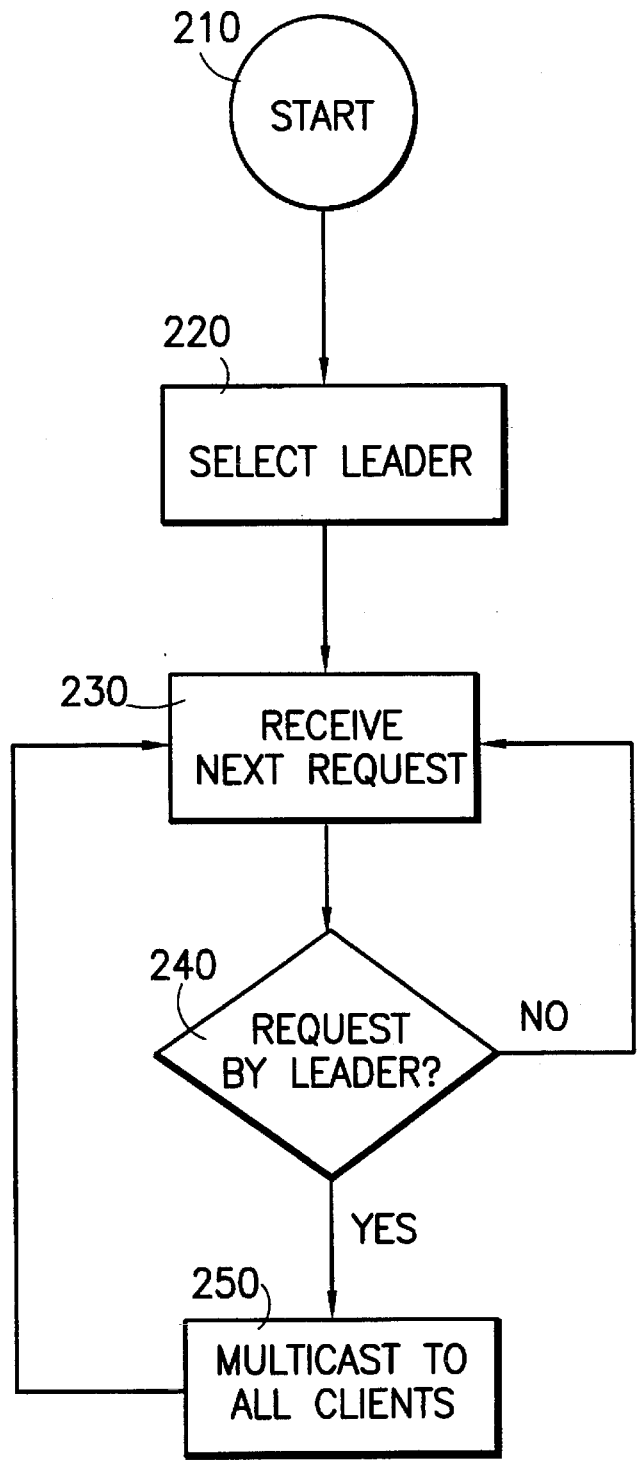
FIG. 2 shows the pace control of multicasting under a static leader selection scheme.

FIG. 2 shows the pace control of multicasting under a static leader selection scheme. At the time of setting up a multicasting session, in step 220 the session manager 145 designates one of the clients as leader. The designation can be made by any number of criteria, such as random selection, address order or a priority scheme. The video player 150 receives a pull request for sending the next data block from a client in step 230. Then, in step 240 the video player checks to see if the request was made by the designated leader. If yes, in step 250 the video player multicasts the next data block to all clients in the multicast group, and waits to receive next client request. If not, the video player ignores the request. For better efficiency, during session setup the session manager can instruct all of the clients except the designated leader not to make pull requests.

Figure 3:
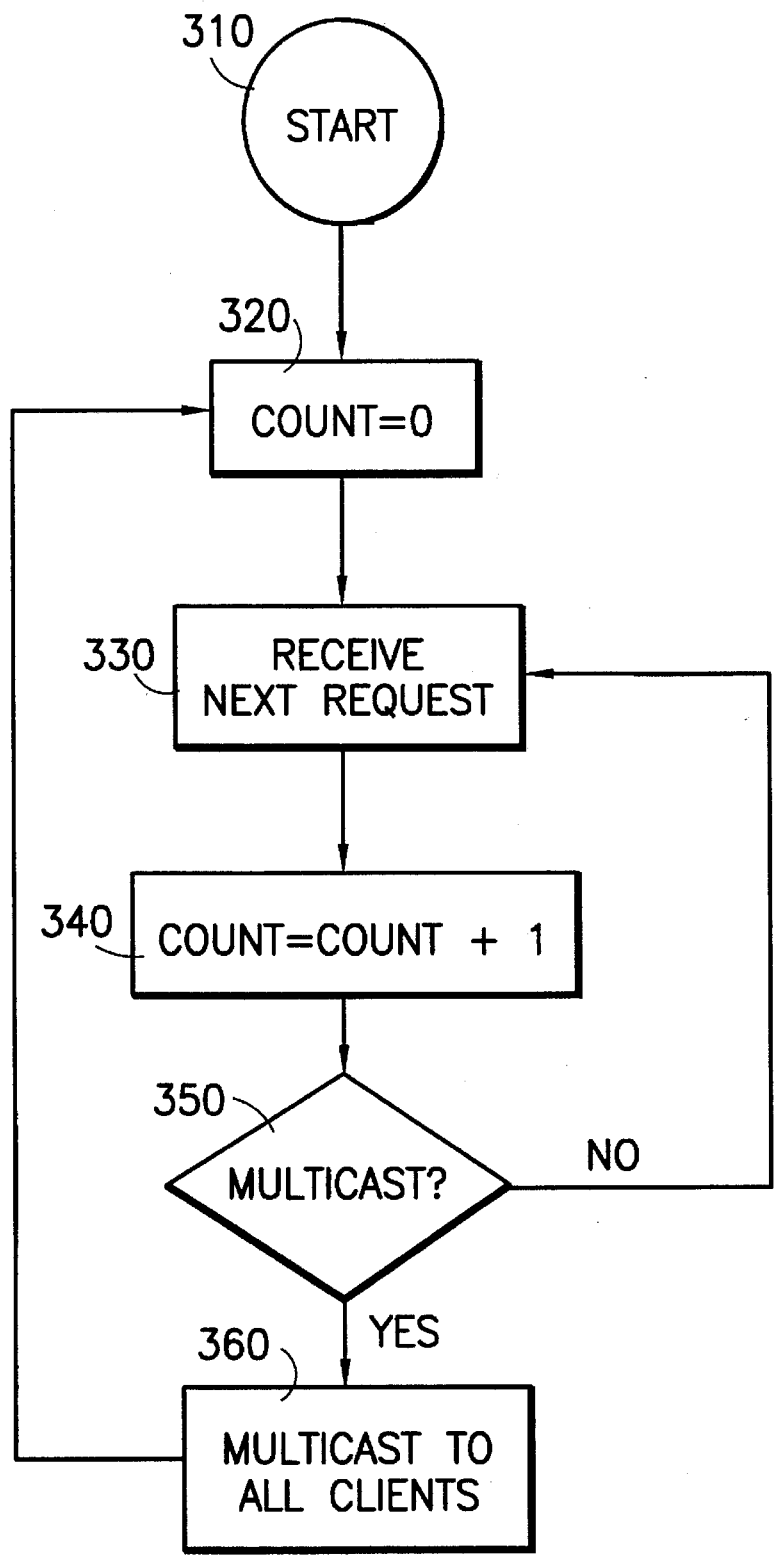
FIG. 3 shows the handling of multicasting based on dynamically selected leader.

FIG. 3 shows pace control of multicasting under an alternative scheme where a leader is selected dymanically for each block to be multicast. In this embodiment, the video player maintains a count of client pull requests received so far (from members of the multicast group) since the previous multicast of data block to the multicast group. It should be understood that a separate count is maintained for each multicast group. This count is also maintained in a data structure shared by the session manager 145 and the video player 150. At the time of setting up a multicasting session this count is set to zero by the session manager. Subsequently, the video player initializes the count to zero after transmission of each block. Both initializations are reflected in step 320. In step 330 the video player receives client pull requests (within a given multicast group) for the next data block. In response, the video player increments the count in step 340. In step 350, the video player checks to see if the condition for multicast of next data block is satisfied based on current count value. This can be for example, a determination as to whether the number of requests received for the group exceeds a given threshold (e.g. some fixed number or more than a 50% of the clients). If not, in step 330 the video player 150 waits for arrival of new client requests. Otherwise, in step 360 the video player multicasts the next data block to all clients in the multicast group, and begins a new round of multicast in step 320.

Figure 4:
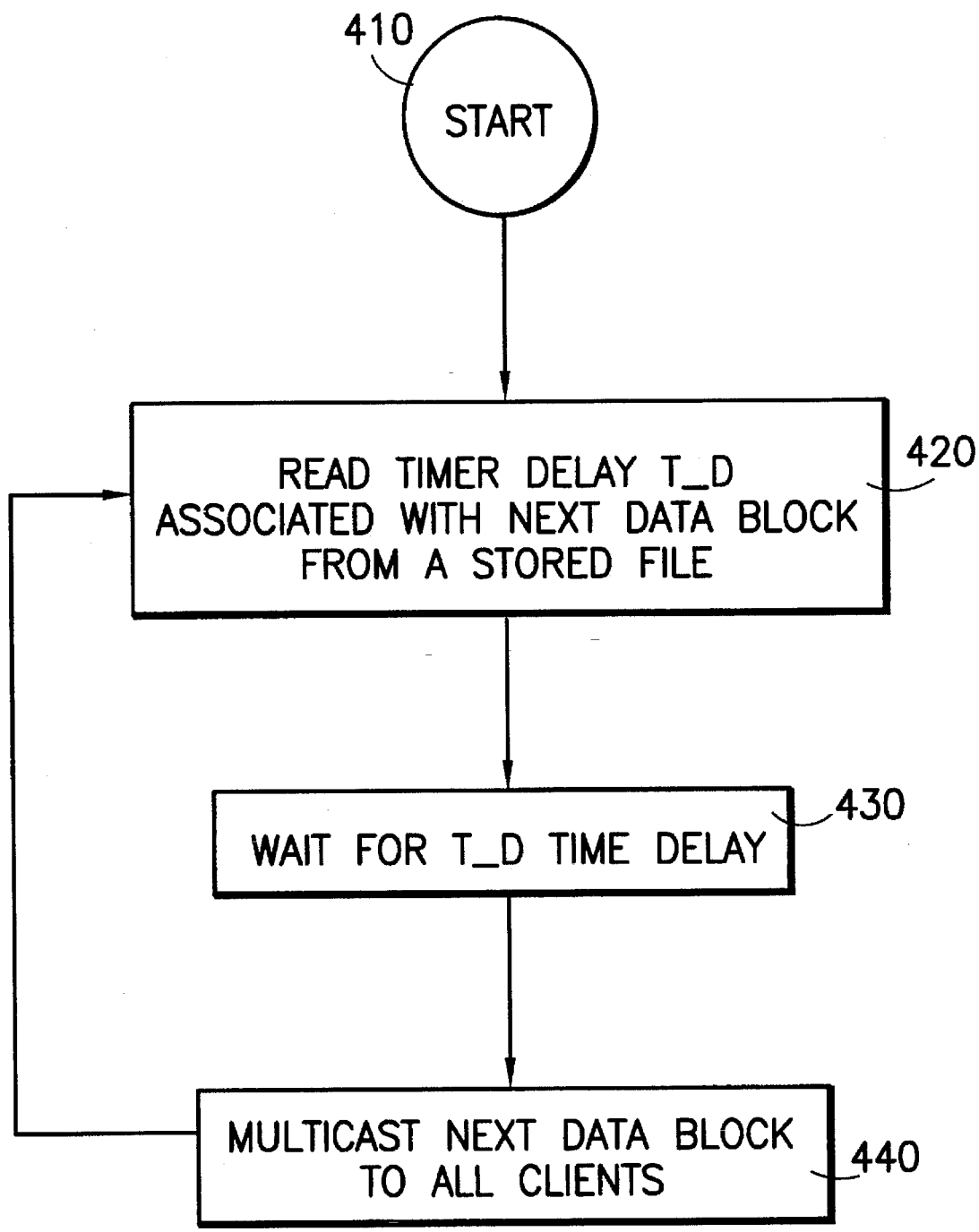
FIG. 4 shows the pace control of multicasting based on stored timing information for pace control.

FIG. 4 shows another embodiment where pace control of multicasting is performed using stored timing information (play history). In step 420 the video player reads the play history for the next block to be multicast from the video attribute file 133 for the video being multicast. For each block of the video, the video attribute file includes the required time delay, $T\_d$, since the multicast of the previous data block. This time delay $T\_d$ is an estimate based on a previous playback of the video (as discussed in more detail with reference to FIG. 5). The video player 150 waits for this time delay in step 430. The video player then multicasts the next data block to all clients in the multicast group in step 440 and begins a new round of multicast in step 420.

Figure 5:
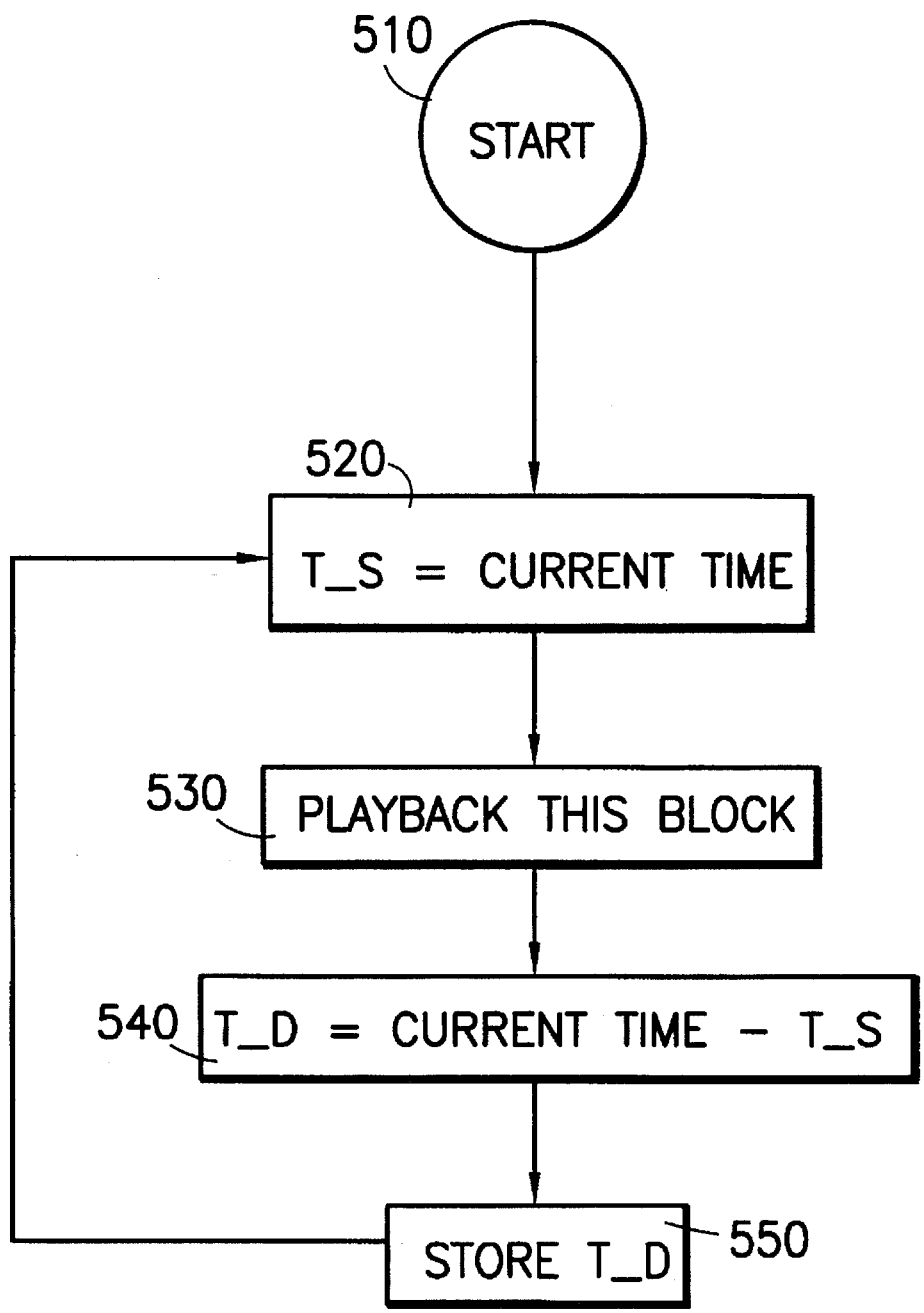
FIG. 5 shows the storing of playback timing information.

FIG. 5 shows the storing of timing information required for future multicast as in FIG. 4. During a previous playback session of the multicast video (which could be to a different user or multicast group), in step 520 (before starting the playback of the current data block, B1) the video player notes the time in a storage location $t\_s$. Then, in step 530, video player waits until the client or multicast group signals that it is ready for transmission (by the server) of the next block of the video. Upon receiving this signal (which is, in effect, a request for the next block of the video for this session) the video player stores the current time ($c\_t$) and sets $T\_d = c\_t - t\_s$. In step 550, $T\_d$ is stored in the video attribute file 133 for the video along with the block number for block B1. The value $T\_d$ is used by the process of FIG. 4 for multicast pace control for a later playback of the video in another session. The video player then returns to step 520 to prepare for the next round of transmission.

It should be understood that in FIGS. 2–5, the loops are exited and the multicast session is closed once the last block of the video has been transmitted to the clients by the video server.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method for controlling transmission of a data stream by a server to a plurality of clients in a multicast group, comprising the steps of:

designating one of the clients as a leader;

when a service request for transmission of a portion of the data stream is received by the server from any of the clients, determining if the service request was from the leader; and, responsive to determining that the service request was from the leader, broadcasting the portion of the data stream to the clients in the multicast group and otherwise deferring the broadcasting.

2. A method for controlling transmission of a data stream by a server to a plurality of clients in a multicast group, comprising the steps of:

a) receiving, by the server, a service request for transmission of a portion of the data stream from any of the clients;

b) responsive to receipt of the service request, determining if a predetermined broadcast criteria has been satisfied;

c) responsive to a determination that the broadcast criteria has been satisfied, broadcasting the requested portion to all of the clients in the multicast group; and, d) responsive to a determination that the broadcast criteria had not been satisfied, repeating step b when another service request is received from any of the clients.

3. The method of claim 2 wherein the broadcast criteria is based on a number of clients in the multicast group that have requested the same portion of the data.

4. The method of claim 2 wherein the broadcast criteria is that a time interval since commencement of broadcasting of a previous portion has exceeded a time duration determined from a previous playback of the previous portion.

5. A computer readable memory having a computer program instantiated therein which when used by a computer will cause the computer to control transmission of a data stream to a plurality of clients in a multicast group by designating one of the clients as a leader; when a service request for transmission of a portion of the data stream is received by the computer from any of the clients, determining if the service request was from the leader; and, responsive to determining that the service request was from the leader, broadcasting the portion of the data stream to the clients in the multicast group and otherwise deferring the broadcasting.

\* \* \* \* \*